United States Patent [19]

Lebduska

[11] 4,309,105

[45] Jan. 5, 1982

[54] METHOD AND APPARATUS FOR TESTING PERFORMANCE OF FIBER OPTIC CABLE COMPONENTS AND ASSEMBLIES

[75] Inventor: Robert L. Lebduska, La Mesa, Calif.

[73] Assignee: The United States of America as represented by the Secretary of the Navy, Washington, D.C.

[21] Appl. No.: 126,498

[22] Filed: Mar. 3, 1980

[51] Int. Cl.³ .................... G01N 21/84; G01N 21/88; G01N 21/59

[52] U.S. Cl. .................................. 356/73.1; 356/239; 356/434

[58] Field of Search ...................... 356/73.1, 239, 434, 356/435

[56] References Cited

U.S. PATENT DOCUMENTS 4,090,793  5/1978  Lebduska ........................... 356/73.1

OTHER PUBLICATIONS

"Military Standard Fiber Optics Test Methods and Instrumentation", DOD-STD-1678, Nov. 30, 1977.

"Instrument for Testing Telecommunications Optical Fibres", Few, Optical Engineerng, vol. 15 #3, May—Jun. 1976, pp. 241-243.

"Measurement of Baseband Frequency Response of Multimode Fibre by Using a New Type of Mode Scrambler", Tokuda et al., Electronics Letters, Mar. 3, 1977, vol. 13, No. 5, pp. 146-147.

*Primary Examiner*—Vincent P. McGraw
*Attorney, Agent, or Firm*—Richard S. Sciascia; Ervin F. Johnston; George J. Rubens

[57] ABSTRACT

Optical performance characteristics of fiber optical cable components and assemblies are tested for quality in an accurate, consistent, and stable manner by the method and apparatus of this invention. The novel apparatus enables acceptability testing of a supplier's fiber optic component/assembly by comparing its optical transmission level with the level of a similar known acceptance cable or a calibration cable, the latter two cables being incorporated in the invention apparatus. Other optical parameters can be tested by this invention to determine additional line losses, such as insertion losses, optical continuity, signal modulation, etc. Stability in the test method is assured by utilizing a variable, calibrated power source. The accurateness of the method is achieved by simultaneously coupling light from a common optical source into both the invention apparatus cables and the fiber optic cable component/assembly to be tested, which arrangement eliminates amplitude drift of the optical source and of the apparatus detector from affecting the validity of subsequent relative measurements of the optical outputs.

4 Claims, 10 Drawing Figures

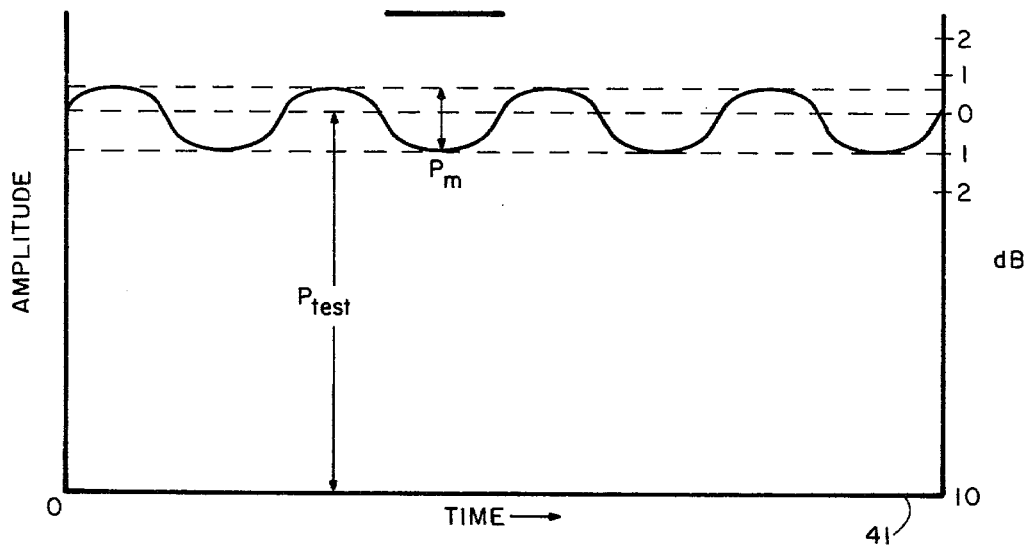
FIG.5
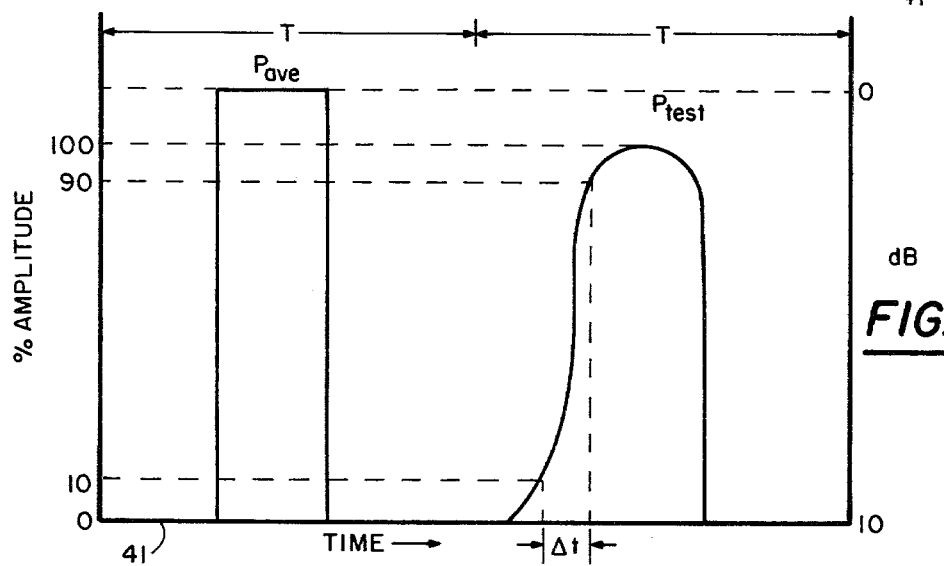
FIG.6
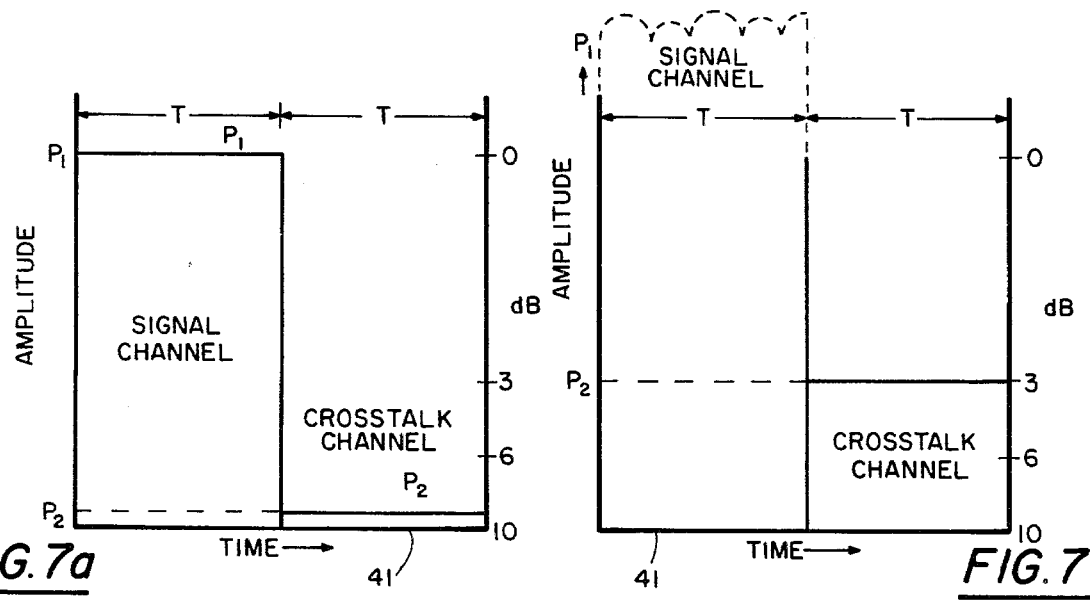
FIG.7a
FIG.7b

METHOD AND APPARATUS FOR TESTING PERFORMANCE OF FIBER OPTIC CABLE COMPONENTS AND ASSEMBLIES

BACKGROUND OF THE INVENTION

This invention relates to test apparatus, and more particularly to a method and apparatus for testing optical performance characteristics of fiber optic cable assemblies and components.

Fiber optic technology is a relatively new art in which interest has been given great impetus recently, particularly for military applications. Under these circumstances, as is usually the case, little has been done to establish accurate performance criteria for the various fiber optic assemblies that are being designed to be used in various system applications. The term assemblies, as used herein, is intended to include individual components, i.e. fiber optic cables per se and their combination for in-line separable connectors or permanent splice connectors, optical couplers, and terminals, etc. Test methods currently employed require very stable light sources, and very stable optical detectors to eliminate the measurement drift associated with performing optical measurements over fairly long intervals of time between measurements. Drift-free optical sources are usually a laboratory tool and not suitable for different types of test measurement, and for the most part are difficult to maintain. Also, such prior art methods are manual in operation, cumbersome to use, time consuming, do not have automatic read-out, and do not possess recording capability.

SUMMARY OF THE INVENTION

A method and apparatus is designed to test the performance parameters of fiber optic cable assemblies. These parameters include transmission level losses due to poor surface finish conditions of the optical faces of the fiber optical cable terminations; optical insertion loss due to the insertion of a connector into the assembly; interruptions in the optical continuity; signal distortion; and crosstalk across and between optical fiber junctions. These parameters must be measured accurately with a high degree of confidence by a user to permit standard qualifications and acceptance of the fiber optic cable assemblies submitted by various suppliers and manufacturers.

The test apparatus comprises a chassis in which is mounted a common optical source having two optical output connectors mounted on a panel face. Also mounted within the chassis is an optical detector including a sensor having two optical input connectors also mounted on the panel face. Initially, to test the optical quality of a pair of test fiber optic cables normally furnished by each manufacturer with each of his fiber optic components, the test apparatus may include a test acceptance fiber optic cable, of the same length and type as each of the manufacturer's test optical cables. The test acceptance cable has both of its terminal end surfaces very finely polished to be of known acceptance quality for establishing a standard transmission level. During the initial test, the test acceptance cable is connected between one pair of the output and input connectors, and the manufacturer's test cables are individually connected between the other pair of output and input connectors. To be qualified and acceptable for further testing, the power level of the manufacturer's test cables should fall within, for example, 5% of the power level of the test acceptance cable.

After qualifying each of the unmated manufacturer's test cables, in the case of repairable or separable assemblies, the test cables are then mated to each other, or to the component to be tested, i.e. a fiber optic coupler, for testing the entire assembly of the component and the connected test cables. To determine the power level of the insertion loss of the mated cables or assemblies, the test cables are connected across one of the output and input connectors of the optical source and optical detector, respectively, similarly as was done for the test acceptance cable. A calibration cable, having a length equal to the combined lengths of the manufacturer's test cables, and of the same type of fiber glass, is connected across said other pair of output and input connectors. Connected in the calibration cable is a variable optical attenuator for changing the optical power level. The simultaneous coupling of the optical source to both the calibration cable and the test cable assembly during measurements eliminates any amplitude drift in the optical source and detector from affecting the validity of subsequent relative measurements between the outputs. The calibration cable can also be used to test a permanent splice assembly of two cables of the same length and type as the calibrator cable.

The novel test set provides an optical measurement that can be automated with a chopper at the detector location, a tuned amplifier at the chopper frequency, and an oscilloscope for relative amplitude measurements. A pulse generator can be provided in conjunction with the radiant source to modulate the output for any distortion measurements that may be desired.

STATEMENT OF THE OBJECTS OF THE INVENTION

It is a principal object of this invention to provide a method and apparatus for testing the optical performance parameters in the design of various types of fiber optic cable assemblies.

Other important objects of this invention are to provide such a method and apparatus which will not depend on very stable optical sources and detectors; which is automatic in operation; which has recording capabilities; and which can be expeditiously performed especially at field installations.

Other objects, advantages and novel features of the invention will become apparent from the following detailed description of the invention when considered in conjunction with the accompanying drawings.

BRIEF DESCRIPTION OF THE DRAWINGS

FIG. 5 is a typical oscilloscope display of the modulation of the optical power level signal across a fiber optic connection assembly, such as in FIG. 2a.

FIG. 6 is a typical oscilloscope display, not to scale, of a pulse waveform power level distortion measurement across a fiber optic connection assembly to be tested.

FIG. 7a is an oscilloscope display showing how the oscilloscope gain is calibrated for a crosstalk measurement of a multi-channel fiber optic cable assembly.

FIG. 7b is the same display showing the calibrated amplitude of the crosstalk distortion in one of the channels of said cable assembly after the oscilloscope gain has been increased.

DESCRIPTION OF THE PREFERRED EMBODIMENT

Figure 1:
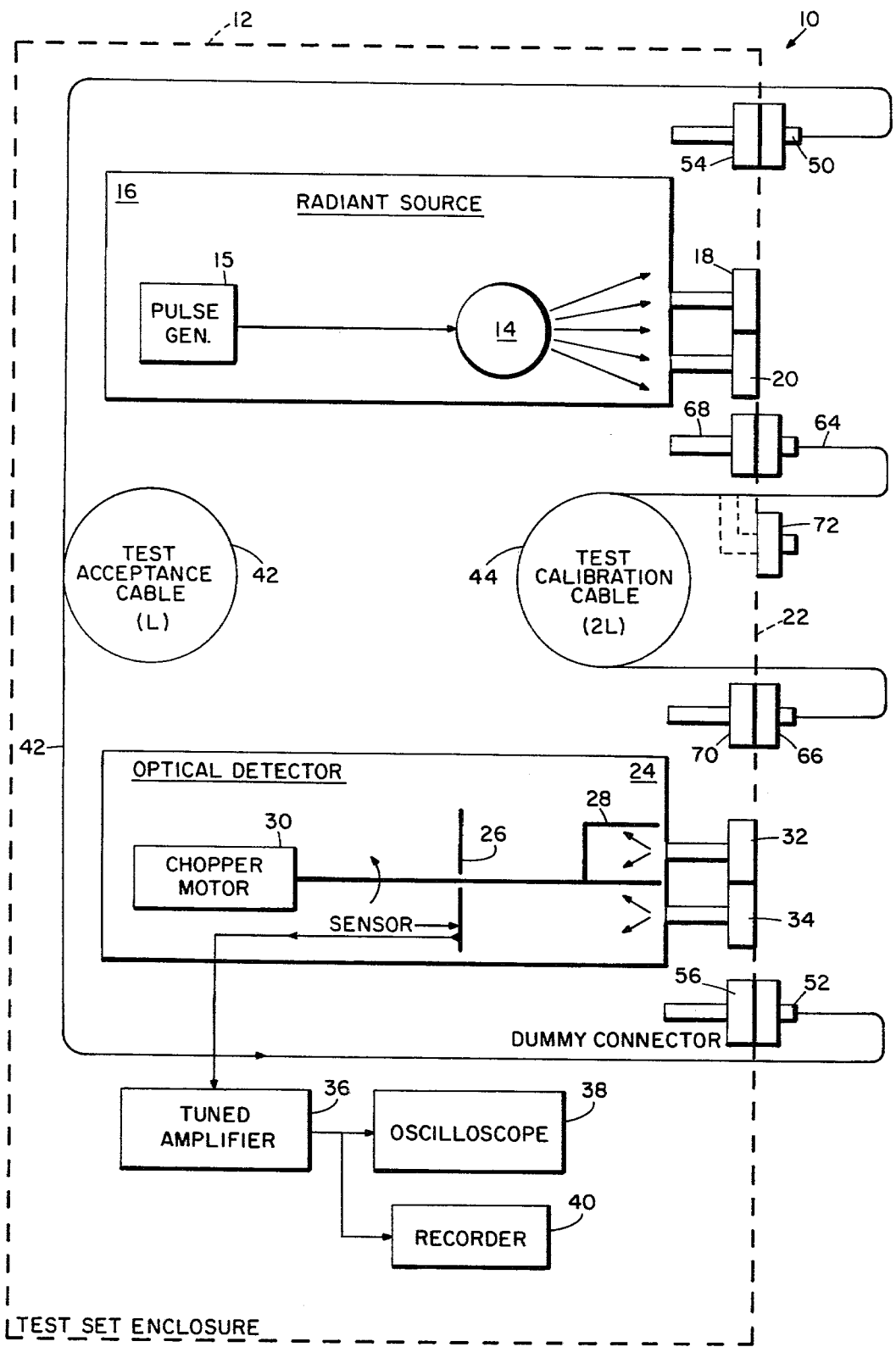
FIG. 1 is a diagrammatic plan view of the novel test apparatus showing the disposition of its components.

Referring to the drawings where like reference numerals refer to similar parts throughout the drawings, there is shown in FIG. 1 an apparatus 10 for testing different optical performance characteristics of fiber optic cable assemblies. The term "fiber optic cable assembly" is intended to include various types of fiber optic cable configurations that may be submitted for test, for example, by a supplier of such products, for qualification testing, such as a permanently spliced cable connection, illustrated in FIG. 2c, and fiber optic cables for separable connectors illustrated in FIGS. 2a and 2b, as well as couplers, terminals, and the like, not illustrated. Various tests may be accomplished by the novel apparatus 10, such as acceptability of the finish of the cable fiber faces, insertion losses due to the connection between mating cable fibers, connector continuity measurements, signal modulation measurements, pulse waveform distortion measurements, crosstalk measurement, etc.

Test apparatus 10 of FIG. 1 comprises a suitable chassis 12 in which is mounted a conventional optical source, such as an LED 14, suitably housed in an enclosure 16. It should be apparent that other types of optical sources may be employed other than visible light. A pulse generator 15 may be associated with source 14 to provide pulse modulation needed for certain types of tests. A pair of output terminals 18 and 20 extend from enclosure 16 to a chassis face 22 for convenient access to the operator during the testing process. An optical detector 24 is also mounted within chassis 12, and includes an optical assembly 26, being a light sensor in the specific embodiment, and a rotatable light chopper 28 driven by a motor 30. A pair of input terminals 32 and 34 extend from detector 24 to panel face 22, light chopper 28 being disposed between sensor 26 and the input terminals.

Light chopper 28 consists of an opaque semi-circular disc which when rotated will cause an alternate interruption of the optical signals to be detected from input terminals 32 and 34, and which can be manually positioned to block the optical signal from either input terminal not in use.

The electrical output from sensor 26 is connected to a tuned amplifier 36 which feeds signals to a conventional oscilloscope 38, for relative amplitude comparison measurements and if desired, also to a recorder 40. A semi-log grid 41 (FIG. 4) is provided for oscilloscope 28 in which the abscissa is time (most likely in milliseconds) and the ordinate is a log scale calibrated in dB of optical power.

Figure 2C:
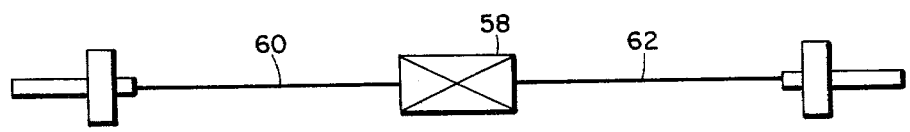
FIGS. 2a, 2b and 2c illustrate examples of different fiber optic cable assemblies that can be tested with the novel test apparatus illustrated in FIG. 1.
Figure 2B:
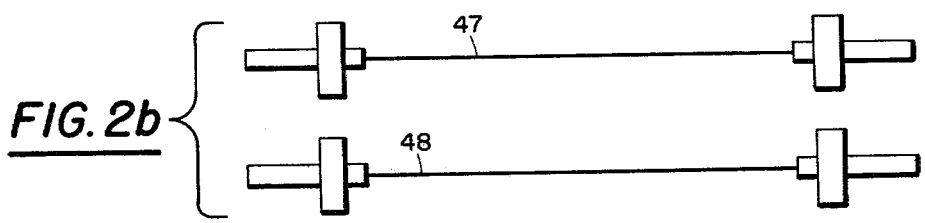
Figure 2A:
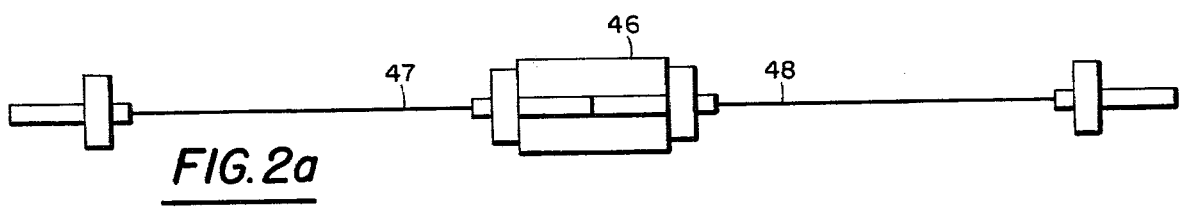

A test acceptance cable 42 and a test calibration cable 44, each of which may be referred to as a standardization cable, are provided in apparatus 10 for the different tests to be conducted peculiar to the fiber optic cable assembly to be tested, i.e. that of FIGS. 2a to 2c, or the like.

Test acceptance cable 42 is provided to test the individual cables 47 and 48 of FIG. 2b. To achieve this result the test acceptance cable must be fabricated of a predetermined length, for example, a length (L) of 2 meters has been found practical. The precise length of cable 42 is not critical, but it must be relatively short in length so that the transmission light loss due to the cable per se is very small compared to the transmission light loss caused by a poorly finished end surface of the cable. However, the length of acceptance cable 42 must be the same cable length and preferably a sample taken from the manufacturer's run of the type cable to be tested. In the separable cable assembly of FIG. 2a, a separable connector 46 is provided with two detachable cables 47 and 48 (FIG. 2b), each cable being the same length (L) as acceptance cable 42, namely 2 meters. The ends of acceptance cable 42 project freely beyond chassis face 22 and are provided with end terminations 50 and 52 having optical fiber faces prepared to the most exacting surface finish conditions. To protect the end terminations when not in use during the test procedures, they may be stored in dummy connectors 54 and 56 mounted on panel face 22. The free ends of cables 47 and 48 are provided with suitable terminals as are terminals 50 and 52, and matable with the input and output terminals. The manner in which cables 47 and 48 are tested by test acceptance cable 42 will be described under a section on "operation".

Test calibration cable 44 is provided in test apparatus 10 to accommodate the qualification testing of the mated separable cable assembly of FIG. 2a, or other separable cable assemblies. To accommodate such cable assemblies, test calibration cable 44 must be as long as the combined length of cables 47 and 48, that is, 2L or 4 meters in length. The two free ends of calibration cable 44 are also provided with end terminations 64 and 66 having finely polished end faces which are protected when not in use by housing in dummy connectors 68 and 70, respectively mounted on chassis panel 22. A variable optical attenuator 72, of conventional design, and mounted on the face of panel 22 to be manually adjustable, can be by-passed or connected in series with calibration cable 44 for setting its power level depending on the test to be performed.

As a practical matter test calibration cable 44 (with attenuator 72 in a by-passed condition) can also be used to determine the acceptance of the permanently spliced cable assembly of FIG. 2c where each of the integrally connected cables 60 and 62 are of a length of L, making the total length of the assembled, spliced connection 58 the exact length of the test calibration cable 44 (2L). In this respect test calibration cable 44 is providing the acceptance tests of splice connection assembly 58, like test acceptance cable 42 provides for separable cables 47 and 48.

Operation

Test apparatus 10 is used in the following different operations to test the optical performance of various types of fiber optic cable assemblies. These tests determine various power losses in the various fiber optic cable assemblies due to insertion loss, connector continuity losses, signal modulation losses, pulse waveform distortion measurements, and crosstalk measurements. The first test to be described involves insertion losses that occur in the separable connector assembly of FIG.

2a and splice connection assembly of FIG. 2c. To assess the insertion power loss of separable connector cable assembly 46 of FIG. 2a, it is first necessary to determine the transmission quality of both unmated cables 47 and 48 (FIG. 2b), that is, the acceptability of the finish at their fiber end surfaces. In other words, cables having poor surface finish will be eliminated from subsequent insertion loss measurements, to be described.

Ends 50 and 52 of acceptance cable 42 are detached from dummy connectors 54 and 56, respectively, and connected to output terminal 18 and input terminal 34, respectively. The optical output level P$_{42}$ (cable 42) measured at oscilloscope 38 or recorder 40 establishes an ideal acceptable transmission level, for subsequent testing, which level can be designated as zero dB loss. Thereafter, the ends of acceptance cable 42 are returned to dummy connectors 54 and 56 for safe keeping.

Connector assembly cables 47 and 48 are then each connected, one at a time, between output and input terminals 18 and 34 and their respective power levels P$_{47}$ and P$_{48}$ are measured. The relative values of power levels P$_{47}$ and P$_{48}$ should fall within 5% ($\pm$0.1 dB) of power level P$_{42}$ in order that the test method can advance to the next step of P$_{av}$=(P$_{47}$+P$_{48}$)/2, which is the average light power level inputing connector 46 junctions (i.e. at input terminal 34) and this value will be used later in the insertion loss test.

Figure 3:
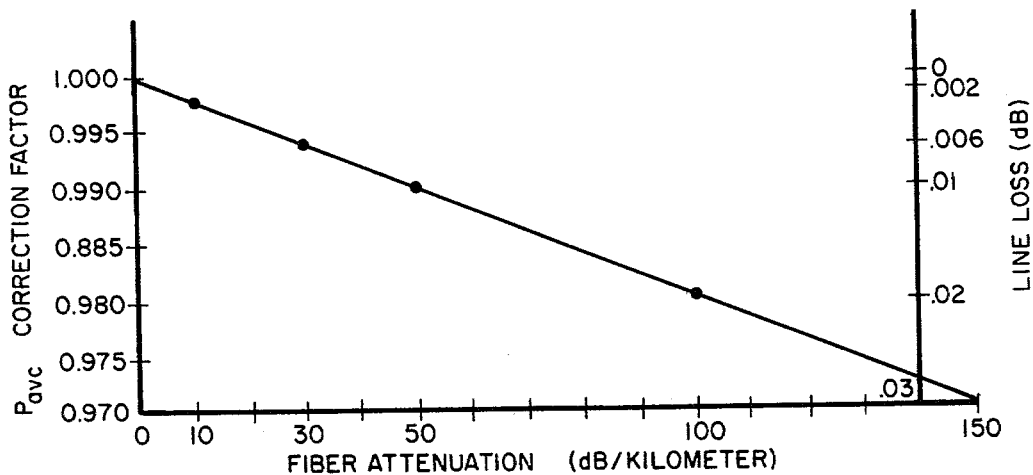
FIG. 3 is an insertion loss power correction chart for a separable fiber optic cable assembly of predetermined length.

It is next necessary to determine the power level line loss in cable 48 which occurs when cables 47 and 48 are mated with separable connector 46 to form the assembled fiber optic cable assembly of FIG. 2a. The free end of cable 47 is connected to output terminal 20 and it should be made clear that although cables 47 and 48 have been found to be of acceptable quality when compared to test acceptance cable 42, it is now necessary to determine the amount of power loss between the point at which cable 47 is connected to connector 46 and the output power at the end of cable 48 (which is inputed to terminal 34). This power loss represents the combined power loss due to the mating of connector 46 in addition to the line loss of cable 48. Since the insertion loss of connector 46 is the specified test parameter to be obtained, it is first necessary to determine the line loss of cable 48 to correct, that is to reduce, the average power level (P$_{av}$) by a power level equivalent to cable 48 line loss. Since the attenuation of the cable fiber type used is known, and the test cable lengths 47 and 48 are also known, cable 48 line loss can be calculated. FIG. 3 shows the P$_{av}$ power correction as a multiplying factor for reduction of P$_{av}$ as a function of fiber attenuation for length L (2 meters) of cable 48. Therefore, the P$_{av}$ correction factor for the specified cable fiber should be obtained from FIG. 3 and multiplied by P$_{av}$ to determine the corrected average power (P$_{avc}$).

It is seen that for cable fibers of low attenuation, the P$_{av}$ power correction approaches unity, and the influence of cable 48 line loss on the insertion loss measurement may be negligible. Cable 48 line loss in dB is also plotted in FIG. 3.

As an example, it can be seen from FIG. 3 that for a cable fiber attenuation of 50 dB/KM, a measurement error of only 0.01 dB results from neglecting the P$_{av}$ correction factor. Therefore, the need for this correction will be determined by the level of insertion loss specified, and the accuracy needed for a particular test measurement.

To continue with the insertion power test, connect end termination 64 of test calibration cable 44 to output terminal 20, and end termination 66 to input terminal 32. With attenuator 72, now in series with test calibration cable 44, the attenuator is manually adjusted to change the optical power level at input terminal to correspond to the level of the corrected average power (P$_{avc}$) previously obtained.

The free end of cable 47, of the connected cable assembly of FIG. 2a, is now connected to output terminal 18 and the free end of cable 48 is connected to input terminal 34.

Figure 4:
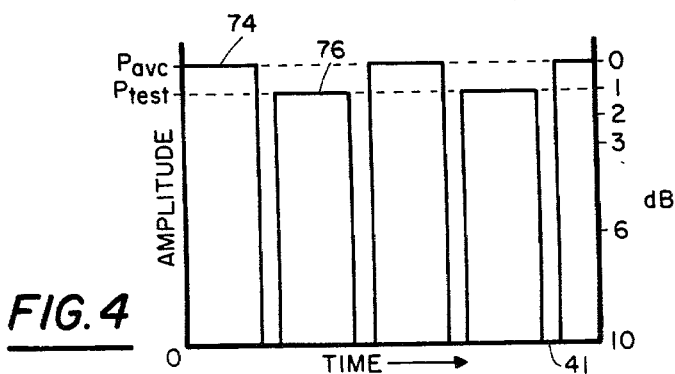
FIG. 4 is an illustrated oscilloscope display of the optical power levels from both the calibration cable and the fiber optic assembly of FIG. 2a being qualification tested, the oscilloscope having a specially designed grid.

Thus, both test calibration cable 44 and the separable cable assembly of FIG. 2a to be tested for insertion loss, are connected to apparatus 10 inputing two optical source signals on detector 26. With motor 30 now energized to rotate chopper 28, both inputed signals are alternately detected, amplified and displayed or recorded on oscilloscope 38 or recorder 40, respectively. Referring now to FIG. 4, the larger signal 74 is the corrected average power level (P$_{avc}$) transmitted through cable 44 and is adjusted to the zero dB level scale on the ordinate of the oscilloscope display by means of the oscilloscope gain control (not shown). The smaller signal 76 is the power level out of the test assembly of FIG. 2a (P$_{test}$).

The insertion power loss of the separable connector assembly (FIG. 2a), of this test, can be read off the ordinate dB scale of FIG. 4 as the difference between the two power levels 74 and 76. If desired, the insertion power loss in decibels (L$_I$) can be calculated by the following formula:

$$L_I = 10 \log (P_{test}/P_{avc})$$

To determine the insertion power loss of the splice cable assembly 58 of FIG. 2c, a similar procedure is followed as described above with reference to the separable connector assembly 46 of FIG. 2a, with the exception that the individual cables 60 and 62 cannot be tested individually to determine the acceptability of their optical end faces. As the overall length of the splice cable connector assembly (FIG. 2c) is 4 meters, the test calibration cable 44 can be utilized to establish an acceptable power level transmission of the combined splice assembly (neglecting splice loss). As in the previous test, acceptance cable 44 is of the same type as cables 60 and 62. Cable 44 terminations 64 and 66 are connected to output terminal 20 and input terminal 32, respectively, with variable optical attenuator 72 in a bypassed, inoperative condition. The free ends of cables 60 and 62 are now connected across output terminal 18 and input terminal 34, respectively. With motor 30 in an energized condition to rotate chopper 28, both inputed signals are alternately detected, amplified and displayed or recorded on oscilloscope 38 or recorder 40, respectively. For all practical purposes, the power level difference, i.e. between the power level transmitted by test calibration cable 44 and the power level transmitted by splice assembly 58 (P$_{44}$-P$_{58}$) corresponds to the power consumed within the splice. The splice insertion loss in decibels can be calculated by:

$$L_I = 10 \log (P_{58}/P_{44})$$

or by observing the difference in power level on the oscilloscope display 41.

Upon completion of the above test the ends of cables 60, 62 and 44 are disconnected from the respective terminals of apparatus 10.

Another type of test that can be conducted by apparatus 10 involves a measurement of the interruption of optical continuity across the optical junction in a connector caused by vibration, shock and other mechanical test exposures. The test is equally applicable to both the separable connector assembly 46 and the permanent splice connector assembly 58. The test is performed by sequentially connecting the respective free ends of the cables of each assembly (FIG. 2a and 2c) across output terminal 18 and input terminal 34 (capping off terminal 32 from the entrance of any ambient light). With detector chopper 30 inoperative and positioned to allow the passage of the continuous light power level entering terminal 34 from the respective connector assembly to be recorded on recorder 40 and/or displayed on oscilloscope 38 as a solid uninterrupted horizontal trace on display 41 (not shown). The synchronization controls on the oscilloscope (not shown) shall be set to minus "sync" so that upon setting a predetermined synchronization rate in the oscilloscope (the specification of which is to be determined by the modulation rate of the optical signal to be transmitted), the trace drops out of the display indicating that a single interruption of the signal has occurred at the specified or at a slower rate caused by a lack of continuity across the optical junction.

Another test that can be conducted with apparatus 10 is the measurement of the optical signal amplitude modulation across the optical connector junction caused by a mechanical or environmental stress that affects the level of optical transmission. The test is performed by connecting the respective cables of the connector assemblies in the same manner as described above in the continuity test. The synchronization controls of oscilloscope 40 are now set to provide a normal horizontal trace on display 41 and the oscilloscope gain control is set to position the trace power level of the respective connector assembly ($P_{test}$) to correspond to zero dB on the display ordinate scale (see FIG. 5). This is the unmodulated level of $P_{test}$.

The next step in this test is to subject the respective assembly to the specified test environment, and observe the trace of $P_{test}$ which assumes a modulated waveform. FIG. 5 illustrates a typical simulated waveform configuration. The total peak-to-peak variation ($P_m$) of the waveform of $P_{test}$ can be measured directly from the oscilloscope display 41.

The modulation level (M) also can be calculated by the following formula:

$$M = 10 \log (P_m/P_{test}) \text{ in dB},$$

where
$P_{test}$ is the unmodulated power level of the respective connector assembly and
$P_m$ is the peak-to-peak modulation of $P_{test}$.

Still another test that can be conducted with apparatus 10 is the measurement of the pulse waveform distortion which occurs across an optical junction in a fiber optic connector assembly. Calibration cable 44 and either of the respective connector assemblies 46 or 58 to be tested are connected across the respective terminals of apparatus 10 in the same manner as previously described. For this test, pulse generator 15 and detector chopper 28 are both energized, with pulse generator 15 pulsed at twice the rate of chopper 28 and synchronized therewith. The pulses emitted by source 14 are transmitted simultaneously through both the calibration cable 44 and the selected test assembly and are alternately sampled and detected by chopper 28 and detector sensor 26, respectively. The pulse emitted by radiant source 14 should be of high bandwidth to provide a sharp or square pulse waveform for comparison with the pulse transmitted through the test assembly. FIG. 6 illustrates an oscilloscope display 41 showing both transmitted pulses as sampled sequentially by detector 24. The time interval (T) represents the reception period during which detector sensor 26 can receive either one of the pulses $P_{avc}$ or $P_{test}$ being transmitted through calibration and the selected connector assembly, respectively. Assuming no rise time distortion exists in $P_{avc}$ (the leading edge being a square wavefront), the pulse rise time distortion of $P_{test}$ (FIG. 6), as measured in a conventional manner between the 10% and 90% amplitude levels, and is represented by $\Delta t$ of $P_{test}$.

Again referring to FIG. 6, fall time measurement (not illustrated) may be made for $P_{avc}$ and $P_{test}$ in a similar manner as described for the rise time measurements.

Thus, depending on the specific qualification requirements of a particular cable assembly, the rise time, fall time or total time distortion can be measured for acceptance or rejection of the test cable assembly.

Another test that can be conducted with apparatus 10 is the measurement of the crosstalk interference which is particularly significant in multi-fiber optic cable assemblies which transmit a plurality of communication channels across an interfacing connecting means, as distinguished from crosstalk between the cable's fibers per se. This crosstalk is defined as optical power injected from one signal channel into another signal channel in proximity, primarily between the fiber terminations which interfaces are connected together by a separable or splice connection. For this crosstalk test it must be assumed that test cable assemblies, i.e. 46 and 58, are multi-fiber channel cables. To initiate this test, connect the end terminals of only one fiber optic channel selected from a test cable assembly to terminals 18 and 34, this channel can be called the active signal channel. With pulse generator 15 inactive, a continuous source of radiant energy is transmitted through the single channel of the test assembly. Chopper 28 is activated to allow optical power $P_1$ from input terminal 34 to be recorded and displayed on oscilloscope display 41. The gain control on the oscilloscope is adjusted so that the power level of $P_1$ corresponds to zero dB in FIG. 7a. Then select a second channel fiber from the same cable assembly, and optically cap one of the terminals, connecting the other terminal to input terminal 32. The second channel can be called an inactive crosstalk channel and transmits a power level $P_2$ which, if it appears at all on display 41, will be at a very small amplitude level. In other words, FIG. 7a has been employed to calibrate the oscilloscope gain to provide a power reference level ($P_1$) to be equivalent to zero dB.

In order to obtain an actual measurement of the crosstalk level $P_2$ it is necessary to increase the oscilloscope gain, usually in steps of 10 dB, until the crosstalk level $P_2$ appears at a readable dB level on display 41. One need only count the number of 10 dB step increments that have been made and add the readable dB level on the scale to obtain the total crosstalk interference level $P_2$ in the second inactive fiber test channel. It should be noted in FIG. 7b that increasing the oscilloscope gain to obtain a readable crosstalk level will cause the signal channel level $P_1$ to go off the scale. Quantity T, represented in both FIGS. 7a and 7b has been defined in the description relating to FIG. 6. It should also be noted that during the crosstalk measurement in which is utilized a first and second fiber channel, that the terminals of all other channels not involved in the test must be optically blocked to prevent any ambient radiant energy from adversely affecting the crosstalk measurement.

In summary, apparatus 10 is capable of providing quantitative evaluation, in an accurate and stable manner, of various optical performance criteria to enable qualification acceptance of a variety of different fiber optic cable assemblies that may be furnished by a supplier to a user.

Obviously many modifications and variations of the present invention are possible in the light of the above teachings. It is therefore to be understood that within the scope of the appended claims the invention may be practiced otherwise than as specifically described.

What is claimed is:

1. An apparatus for the long term, continuous testing of the optical performance characteristics of a fiber optic cable assembly having a pair of input and output fiber optic cables each having end terminations and of known physical characteristics comprising:
    a radiant energy source mounted on a chassis;
    a pair of optical output terminals oriented to receive and pass radiant energy therethrough;
    a single optical detector mounted on the chassis;
    a pair of optical input terminals oriented to receive and pass radiant energy to the detector being mounted on the chassis;
    a light chopper interposed between the optical input terminals and the detector to selectively permit radiant energy from one optical terminal or the other to the detector;
    a standardization cable having the same optical and physical characteristics as the input and output cables, said standardization cable having optically acceptable end terminations coupled between one optical output terminal and one optical input terminal, the other optical output terminal and the other optical input terminal having the fiber optic cable assembly coupled therebetween; and
    means coupled to the single optical detector for comparing the respective output radiant power levels of the fiber optic cable assembly and the standardization cable assembly when each are connected between a respective pair of output and input terminals.

2. The apparatus of claim 1 wherein two standardization cable assemblies are provided, one assembly being a test acceptance cable assembly to determine the quality of the surface finish of the cable end terminations of the fiber optic cable connection, the other cable assembly being a calibration cable assembly to determine the optical transmission characteristics of the entire fiber optic cable connection.

3. The apparatus of claim 2 wherein said calibration cable assembly is provided with a variable optical attenuator.

4. The apparatus of claim 1 further including:
    a pair of dummy terminals provided to receive and protect the end terminations of the standardization cable assembly for storage.

* * * * *